United States Patent [19]

McElwain et al.

[11] 4,047,396
[45] Sept. 13, 1977

[54] UNIVERSAL JOINT AND CROSS THEREFOR

[75] Inventors: John Christee McElwain, Rochester, Mich.; Lawrence Howard Hogan, Chagrin Falls, Ohio

[73] Assignee: Rockwell International Corporation, Pittsburgh, Pa.

[21] Appl. No.: 686,038

[22] Filed: May 13, 1976

[51] Int. Cl.$^2$ .............................................. F16D 3/26
[52] U.S. Cl. ...................................... 64/17 A; 184/80
[58] Field of Search ............. 64/17 R, 17 A; 184/1 R, 184/14, 80, 105 B

[56] References Cited

U.S. PATENT DOCUMENTS

| 3,204,428 | 9/1965 | Stokely | 64/17 A |
| 3,721,110 | 3/1973 | Bornman | 64/17 A |
| 3,832,865 | 9/1974 | Lewis | 64/17 A |

FOREIGN PATENT DOCUMENTS

| 629,066 | 9/1949 | United Kingdom | 64/17 A |

Primary Examiner—Samuel Scott
Assistant Examiner—Randall Heald

[57] ABSTRACT

A universal joint includes a cross operably connected therein, the cross comprises a body having four trunions extending therefrom along two mutually perpendicular lines, a lubrication network in the body and the trunions to provide lubrication to the cylindrical outer bearing surface of the trunions, the network includes a plurality of branches in communication with and terminating in a counterbore provided internally in each of the trunions, each counterbore having a cylindrical inner surface coaxial with the cylindrical outer bearing surface of the trunions, the counterbore is open at its end opposite the branches, a flow metering member having at least one metering orifice therethrough fixedly disposed within each of the counterbores to meter lubricant flowing from each of the branches downstream into the counterbore and to the bearing means and various bearing surfaces associated therewith including the cylindrical outer bearing surface of the trunions.

10 Claims, 7 Drawing Figures

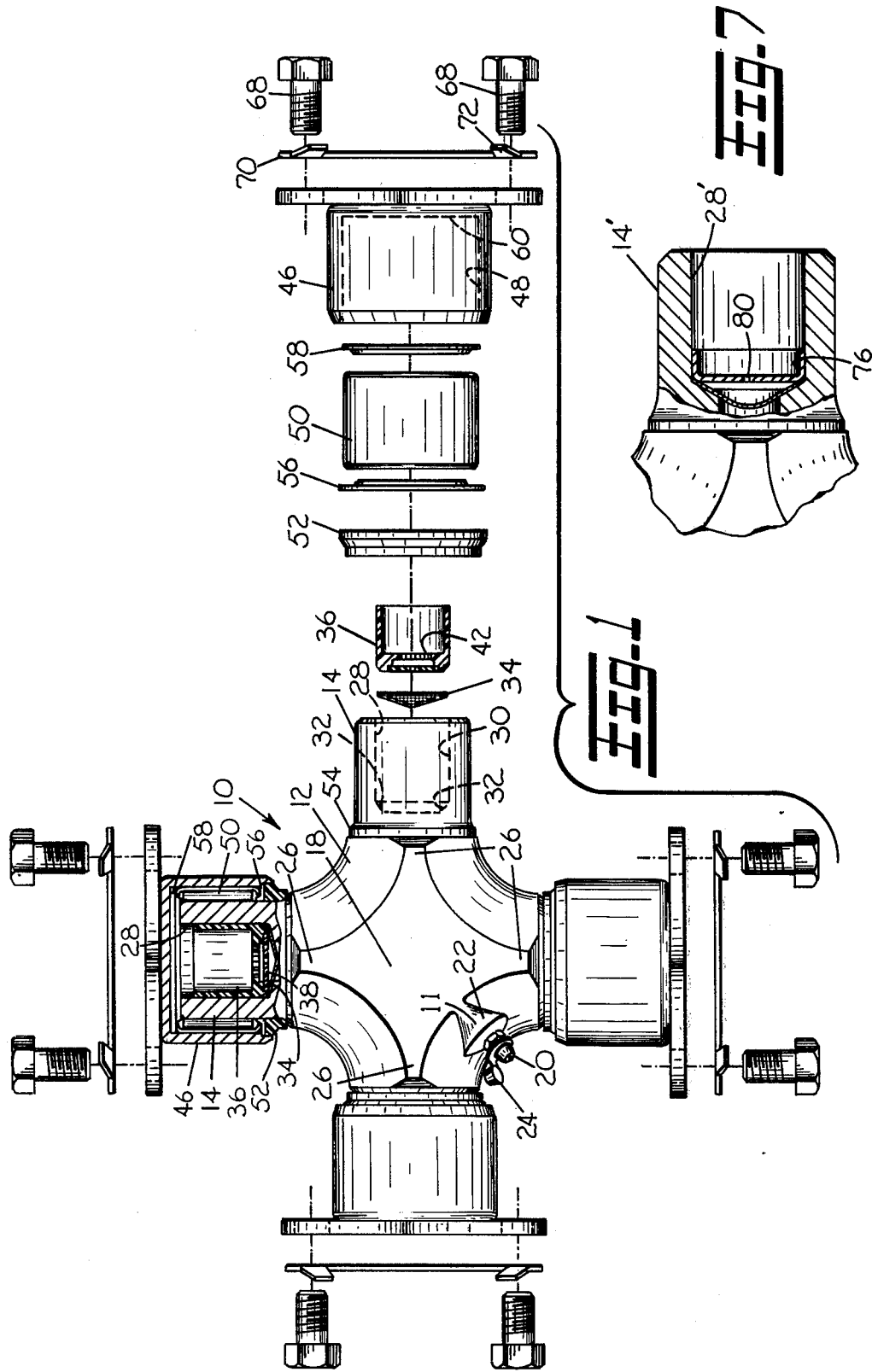

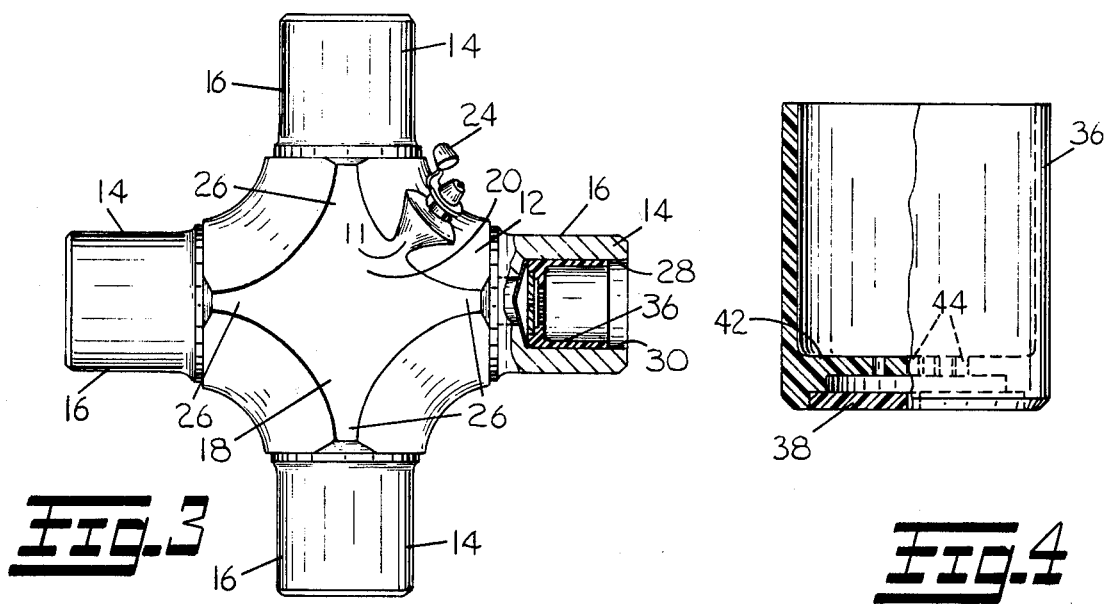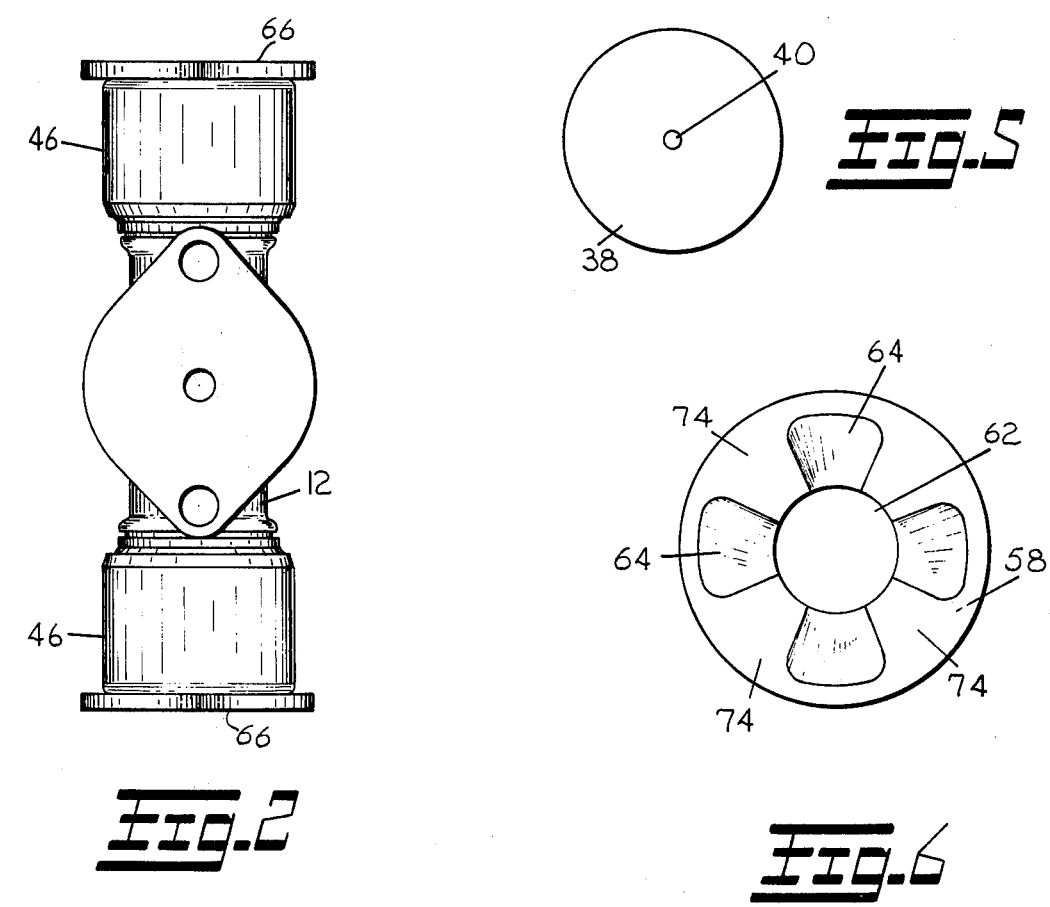

UNIVERSAL JOINT AND CROSS THEREFOR

BACKGROUND OF THE INVENTION

1. Field of the Invention

This invention relates generally to universal couplings and more particularly to universal joints and universal joint crosses.

2. Description of the Prior Art.

The prior art is replete with various forms and types of universal couplings in which internal passages have been provided for lubrication of their various operational parts. Additionally, such prior art universal joints have included additional mechanisms and devices which attempt to improve the lubrication effectiveness. For example, U.S. Pat. No. 3,070,980 to Slaght, patented Jan. 1, 1963, is representative of the prior art providing for an extremely complex bearing cap to enhance the lubricant flow to the needle bearings. U.S. Pat. No. 3,006,168 to Kayser, patented Oct. 31, 1961, also discloses a highly complex and expensive to manufacture self-lubricating universal joint having a multiplicity of parts which may fail during operation. U.S. Pat. No. 3,353,374 to Buthenhoff, patented Nov. 21, 1967, discloses a further example of a highly complex universal joint utilizing a plurality of moving seal and spring loaded devices. U.S. Pat. No. 3,470,711 to Kayser, patented Oct. 7, 1969, discloses yet another example of a highly complex universal joint and, more particularly, a cross therefor including a number of resilient members which may tend to distort and malfunction during operation. Other examples of representative prior art which attempted to solve the lubrication problem are as follows:

| United States Pat. No. | Patentee | Patented |
| --- | --- | --- |
| 1,889,470 | F. A. Garrett | November 29, 1932 |
| 1,968,787 | W. W. Slaght et al | July 31, 1934 |
| 1,992,257 | H. F. Braun et al | March 5, 1935 |
| 2,025,502 | W. B. Fageol | December 24, 1934 |
| 2,081,505 | J. E. Padgett | May 25, 1937 |
| 3,087,314 | V. E. Jarvis et al | April 30, 1963 |
| 3,178,907 | J. M. Lyons | April 20, 1965 |
| 3,242,695 | P. M. Ross, Jr. | March 29, 1966 |
| 3,352,127 | R. L. Skinner, Sr. | November 14, 1967 |
| 3,611,751 | Hans-Joachim Kleinschmidt | October 12, 1971 |
| 3,721,110 | Borneman | March 20, 1973 |
| 3,832,865 | Lewis | September 3, 1974 |

The above-noted voluminous prior art patents all may be generally characterized as highly complex and generally vulnerable to malfunction and expensive to manufacture and none of such prior art devices includes effective means to ensure that each of the critical bearing areas are lubricated during each lubricating cycle. Further, they may be additionally characterized as difficult to maintain in the field, thus, potentially resulting in substantial downtime of the vehicle with which they are operationally associated.

SUMMARY OF THE INVENTION

It is, therefore, a primary object of the present invention to provide a universal joint and, more particularly, a cross therefor which employs a self-contained lubricant control system which is effective, efficient and virtually maintenance free.

Another object of the present invention is to provide a universal joint having a cross including a lubricant metering system which assures the even flow of lubricant to all bearing and operational areas of the cross each time the joint is lubricated.

It is yet another object of the present invention to provide a universal joint having a cross including lubricant reservoirs within the trunions thereof which hold substantially more lubricant to extend the lubrication intervals significantly over the prior art.

It is a still further object of the present invention to provide a filtering means of fine mesh filter screen which will filter the lubricant as it reaches the lubricant reservoir to prevent admission of abrasive particles and dirt into such reservoir and ultimately out into the needle bearings.

It is another object of the invention to provide a universal joing having a cross in which the metering orifice at the reservoir assures an even distribution of lubricant to the needle bearings and bearing caps at approximately 500 p.s.i. and such metering orifice also prevents the flow-back of heated lubricant from the bearings and reservoir when the vehicle is idle so that the lubricant is always available to assure proper needle bearing lubrication.

It is still a further object of the present invention to provide a universal joint having a cross comprising a body having four trunions extending therefrom along two mutually perpendicular lines, a lubrication network in the body and the trunions to provide lubrication to the cylindrical outer bearing surface of the trunions. The network includes a plurality of branches in communication with and terminating in a counterbore provided internally in each of the trunions. Each counterbore has a cylindrical inner surface coaxial with the cylindrical outer bearing surface of the trunions. The counterbore is open at its end opposite the branches. A flow metering member has at least one metering orifice therethrough fixedly disposed within each of the counterbores to meter lubricant flowing from each of the branches downstream into the counterbore and to the bearing means in bearing engagement with the cylindrical outer bearing surface of the trunions.

It is yet another object of the present invention to provide a universal joint having a cross wherein a filtering means is a screen provided upstream of each of said metering orifices to filter particulate matter from the lubricating grease to avoid clogging of the metering orifice and to ensure the free flow of the grease through said orifice.

It is a further object of the present invention to provide a universal joint having a cross wherein the metering orifice member is a substantially rigid member and is held fixedly in place within the counterbore near the radially extending shoulder by interference fit between its outer surface and the inner cylindrical surface of said counterbore.

It is another object of the present invention to provide a universal joint having a cross wherein a diffusion baffle plate having a plurality of apertures therein is fixedly disposed in each counterbore downstream of and near said metering orifice member to provide a uniform flow of lubricant to the bearing means and to avoid the generation of any air pockets within the lubricant flowing to said bearing means.

It is a further object of the present invention to provide a universal joint having a cross wherein there is one metering orifice in the metering member centrally disposed thereon and there are 10 apertures in the baffle plate.

It is a still further object of the present invention to provide a universal joint having a cross wherein the metering member is a steel cupped shaped member whose annular lip is in the interference fit relation with the inner surface of the counterbore.

It is yet another object of the present invention to provide a universal joint having a cross wherein the metering member is of substantially rigid plastic material pressfitted within the counterbore.

It is a further object of the present invention to provide a universal joint having a cross wherein the baffle plate is of substantially rigid plastic material pressfitted within the counterbore.

It is another object of the present invention to provide a universal joint having a cross wherein the metering member and the baffle plate are nylon and each are carried by a cylindrical plastic member whose outer cylindrical surface is in interference fit relation with the inner cylindrical surface of the counterbore.

It is yet another object of the present invention to provide a universal joint having a cross wherein the baffle plate is formed integrally with the cylindrical plastic member made of nylon.

It is a still further object of the present invention to provide a universal joint having a cross wherein the metering member is pressfitted with the inner surface of the nylon cylindrical member.

It is yet another object of the present invention to provide a universal joint having a cross wherein the filtering means is a screen disposed across each of the counterbores with the screens being captured between the metering member and the radially extending shoulder at the end of each of the counterbores.

It is another object of the present invention to provide a universal joint having a cross wherein the bearing means are needle bearings enclosed and operably supported within a bearing cup which covers and surrounds the outer bearing surface of the trunions. The needle bearing is in bearing contact with the cylindrical outer bearing surface and the bearing surface provided on the inner cylindrical surface of the bearing cup. A thrust washer is operably disposed between said bearing cup and said trunion and is in bearing engagement with the radially extending circumferential surface at the end of each of the trunions and the radially extending inner surface of the end of the bearing cup.

It is a still further object of the present invention to provide a universal joint having a cross wherein the thrust washer has channels formed thereon to allow for the passage of the lubricant from the counterbore to the needle bearings.

It is another object of the present invention to provide a universal joint having a cross wherein the branches intersect each other within the body of the cross. An external grease fitting is in communication with the branches by means of a supply bore which annularly intersects the branches at the junction thereof. This grease fitting is provided with a protective cover to shield it from the environment.

It is still a further object of the present invention to provide a cross for a universal joint comprising a body having four trunions extending therefrom along two mutually perpendicular lines, a lubrication network in the body and the trunions provides lubrication to the cylindrical outer bearing surface of the trunions, the network includes a branch in each of the trunions and the branches are in communication with each other and each terminates in a counterbore provided internally and at the end of each of the trunions. Each counterbore has a cylindrical inner surface coaxial with the cylindrical outer bearing surface of the trunions with a radially extending surface at the junction of each branch and the counterbore. The counterbore is open at its end opposite the radially extending shoulder. A flowing meter member has at least one metering orifice therethrough fixedly disposed within each counterbore to meter lubricant flowing from each passageway downstream into the counterbore and to the bearing means in bearing engagement with the cylindrical outer bearing surface of the trunions. A filtering means is a screen provided upstream of each of the metering orifices to filter particulate matter from the lubricating grease to avoid clogging of the metering orifice and to ensure the free flow of such grease through the orifice. A diffusion baffle plate has a plurality of apertures therein and is fixedly disposed in each counterbore downstream of and near the metering orifice member to provide a uniform flow of lubricant to the bearing means and to avoid the generation of any air pockets within the lubricant flowing to the bearing means. There is one metering orifice in the metering member centrally disposed thereon.

It is still another object of the present invention to provide a universal joint having a cross wherein the generally radially extending surface is a radially extending conical surface and the filtering screen is conically formed complementary to the conical surface.

It is a further object of the present invention to provide a universal joint having a cross wherein the thrust washer is made of austempered spring steel and is generally compliant to absorb shock loading.

Other objects of the present invention and details of the structure of the universal joint lube structure will appear more fully from the following description and accompanying drawings.

It is yet another object of the present invention to provide a universal joint having a cross wherein there is a substantially small space between the downstream side of the metering member and the upstream side of the baffle plate.

DESCRIPTION OF THE DRAWINGS

The accompanying drawings referred to herein and constitute a part hereof illustrate the embodiments of the invention and together with the description serve to explain the principle of the invention wherein:

FIG. 1 shows a universal joint in elevation partially in phantom with the several operational parts of one of the trunions in an exploded view with certain parts thereof in section; FIG. 1 also shows the top trunion in a sectional view;

FIG. 2 is a side elevational view of the universal joint of FIG. 1;

FIG. 3 is the universal joint cross of the universal joint of FIG. 1 partially in section;

FIG. 4 is the cylindrical insertable plastic member to be inserted in a counterbore in each of the trunions of the universal joint of FIG. 1;

FIG. 5 is the metering member which constitutes a part of the insertable plastic member of FIG. 4;

FIG. 6 is a thrust washer used in the universal joint in FIG. 1; and

FIG. 7 is a partial sectional view of a trunion showing another general form of the invention.

DESCRIPTION OF THE PREFERRED EMBODIMENTS

Referring now to the drawings and particularly FIGS. 1-6, there is shown a universal joint 10 employing the concept of the present invention. For the purposes of the description of the present invention, the word "axial" shall be used in reference to the axis of rotation of the universal joint connecting the drive shaft members with which it is operably associated and the word "radial" shall mean the direction extending perpendicular relative to the above-mentioned axis of rotation. Unless otherwise mentioned, the words "radial" and "axial" shall be used. and construed in the above manner. The universal joint 10 comprises a number of parts and the basic element of the various parts is the universal joint cross 12. As the name implies, the universal joint cross or cross having two intersecting and perpendicular arms have trunions 14 at each end thereof. The cross of journal cross 12 has a cylindrical bearing raceway surface 16 formed thereon. The bearing surface 16 will be explained in greater detail below.

The journal cross 12 is provided with a lubrication network including a central lubrication area 18. The lubricant, which is typically a high grade lubricant grease, is introduced into the lubrication area by means of grease fitting 20 which is in communication with an intermediate channel 11 which, in turn, is in communication with the central area 18. The grease fitting 20 is provided with a protective cap 24 which maintains the cleanliness of the grease fitting from its hostile environment encountered during operation of the universal joint 10. The central area 18 is provided with a series of branches and, more specifically, with four branches 26 which direct the lubricant toward each of the trunions 14. Each of the branches 26 terminate in a counterbore 28 which is provided internally in each of the trunions 14. The internal counterbores 28 are provided with a cylindrical inner surface 30 coaxial with the cylindrical outer bearing surface 16. A generally radially extending shoulder or surface 32 is provided at the junction of each of the branches 26 and the counterbore 28. The generally radially extending shoulder 32 may be formed in a truncated conical fashion and the purpose of the shoulder 32 will be more fully explained below.

The cross 12 may be characterized, therefore, as a simplistic and rugged structure which is highly adaptable to state-of-the-art forging, machining and grinding techniques. The cross 12 may be manufactured from a range of suitable material as, for example, 8620 steel and may be heat treated after machining and forming typically in a high carbon atmosphere to increase its strength and enhance the lubricity of the bearing surface 16.

The counterbore 28 in each of the trunions 14 is adapted to receive several parts for performing a number of different functions, which functions relate to the filtration, metering, diffusing and ultimate effective delivery of the lubricant to the various critical wear areas of the universal joint 10. As before mentioned, there is provided a generally radially extending shoulder or surface 32 at the junction of the counterbore 28 and each of the branches 26. This frustoconical section acts as a seat for a filtering member or screen 34 which may be shaped in a substantially and complementary conical form. The filtering screen 34 may be generally pressed into place to abut and be seated upon the radially extending surface 32. The filtering screen 34 is held in its operational position by the insertion of a generally cylindrical, substantially rigid cylindrical member 36, i.e., the cylindrical member 36 captures the filtering screen 34 between the radial shoulder 32 and itself. The filtering screen 34 may be manufactured from a wide range of galvanized or stainless steel and has a mesh of approximately 0.022 of an inch. The cylindrical member 36 in its inserted position, as shown in FIG. 3, is in a generally interference fit with the inner cylindrical surface 30 of the counterbore 28. For example, the outer diameter of the cylindrical member 36 may be approximately 0.002 of an inch greater than the inner diameter of the counterbore. The cylindrical member 36 and its various component parts are of critical importance in understanding the present invention and comprise a real and substantial advantage over the prior art as typified by the prior art referred to in the Background of the Invention. The cylindrical member 36 may be manufactured from a plastic material, 6/6 nylon as manufactured by DuPont, and may have such a wall thickness as to allow for its insertion with a 2.002 inch interference fit. The cylindrical member 36 is provided with a flow metering member 38.

The metering member 38 or plate is provided with a centrally disposed metering orifice 40 therethrough which meters the lubricant as it leaves the various branches 26, flows through and is filtered by the filtering screen 34 and encounters the metering plate 38. In a typical application the orifice 40 may be approximately 0. 032 of an inch in diameter. The metering member or plate 38 may be formed integrally with the cylindrical member 36 or otherwise suitably attached or connected thereto as by a pressfit therein. Obviously, mounting techniques and other economics enter into. the specific method and form in which the metering plate 38 is interfitted with the cylindrical member 36.

As the lubricant encounters and is metered by the metering member 38 and flows through the orifice 40 thereof it then encounters a diffusion baffle plate 42. The baffle plate 42 is provided with a plurality of apertures or openings 44 which act to diffuse the lubricant as it flows through the baffle plate 42. It has been found that the action of the baffle plate and, more particularly, the various apertures 44 reduce and substantially eliminate "air locks" or entrapped air within the lubricant stream; thus enhancing the consistency and continuity of flow of the lubricant to the various critical wear areas. As with the metering plate 38, the baffle plate 42 may be formed integrally with or otherwise fixedly attached to the cylindrical member 36. As shown in FIG. 4, the baffle plate 42 is shown formed integrally with the cylindrical member 36 while the metering member is shown pressfitted therein and thereto. The apertures 44 may typically be in a range from 0.040 to 0.050 of an inch. There may be provided in a typical application 10 such apertures 44.

The cylindrical member 36 when in its fully inserted position within the counterbore 28 will not protrude beyond the radial extremity of the trunion but may terminate at or below the inner surface of the counterbore 28.

Each trunion 14 is adapted to receive several operational parts. The bearing cup or cap 46 is adapted to be fitted over each of the trunions 14. The cylindrical inner surface 48 of the bearing cap 46 and the outer cylindrical surface 16 of the trunions provide the bearing raceways for the full complement of needle bearings 50. A resilient seal 52 surrounds and is mounted upon a shoulder 54 provided on each of the trunions 14. A spacer piece 56 is provided between the resilient seal 52 and needle bearing 50 to maintain the rotational alignment of the needle bearings 50 as they encircle the bearing surface 16 of the trunions 14.

Another important element of the present invention is found in the thrust washer 58 provided between the inner end 60 of the cap 46. The thrust washer 58 is best shown in its enlarged form in FIG. 6. The thrust washer 58 is provided with a central bore aperture 62 and alternating offset portions 64 which are offset from the original plane of the washer 58. The thrust washer 58 performs a number of functions including the maintenance of the alignment of the needle bearings 50 in a manner similar to the space piece 56. Additionally, and more importantly, the thrust washer 58 acts as a thrust bearing between the bearing cap 46 and the journal cross 12, i.e., as a generally radial force is transmitted through the cap to the journal cross it is generally absorbed and mitigated by the thrust washer which is a compliant member. This compliance or resiliency is achieved by the alternating offset portions and by the selection of material as, for example, austempered spring steel. This shock absorbing feature of the thrust washer 58 increases the longevity of the overall universal joint 10 and specifically reduces the galling or wear of the ends of the trunions 14. Each of the bearing caps 46 has a plate 66 attached to the tops thereof to secure them to their respective drive member yokes (not shown).

The yokes may be suitably threaded to receive the threaded bolts 68 which secure the plates 66 to the yokes. Thereafter, the bolts are locked in place by suitable locking means such as locking plates 70 having locking tangs 72 thereon.

It can be seen, therefore, that as the lubricant is introduced under pressure through the fitting 20 the pressure will force the lubricant to flow toward the trunions 14 and the critical wear areas (e.g. bearing surfaces 16, 48 and 60, bearing 50, etc.) under pressure in the range of approximately 500 p.s.i. The flow of the lubricant will be from the central area 18 through the branches 26 to be then filtered by the filtering screen 34, metered by the metering member 38 and diffused by the baffle plate 42 and ultimately to the aforementioned critical wear areas in a consistent and effective rate therefrom. The thrust washer will enhance this flow by channeling the lubricant through the channels 74 intermediate the various alternating offset portions 64.

An additional important feature of the present invention is that once the pressurized introduction of lubricant ceases the lubricant will not flow back to the central area 18 from the trunions when the universal joint is in a stationary position. This is achieved essentially by the metering orifice 40 of the metering member or plate. The surface tension of the lubricant at the metering orifice is of such a magnitude as to overcome the force of the lubricant due to gravity even if one of the trunions stops in a vertical direction. The various apertures 44 of the baffle plate 42 also tend to inhibit the return of the lubricant to the central area 18. This is important for the various critical wear areas must be suitably lubricated as they begin to rotate or serious wear damage will occur.

FIG. 7 shows another general form of the present invention in which the various parts are substantially the same as the above-noted structure except that the metering member 76 is a cup like member in which its outer cylindrical surface 28' is pressfitted within the counterbore in each of the trunions 14'. The metering member 76 is provided with a centrally disposed metering orifice 80 which acts in a fashion similar to the metering orifice 40 of the metering member 38. The metering member 76 may be manufactured of a suitable substantially rigid material such as stainless steel, nylon or the like.

Obviously, the present invention is not limited to the specific details as hereinabove described but is capable of other modifications and changes without departing from the spirit and the scope of the appended claims.

We claim:

1. A universal joint including a cross operably connected therein, said cross comprising a body having four trunnions extending therefrom along two mutually perpendicular lines, a lubrication network in said body and said trunnions to provide lubrication to the cylindrical outer bearing surface of said trunnions, said network including a plurality of branches in communication with each other and terminating in a counterbore provided internally in each of said trunnions, each said counterbore having a cylindrical inner surface coaxial with said cylindrical outer bearing surface of said trunnions, said counterbore being open at its end opposite said branches, a flow metering member having at least one metering orifice therethrough fixedly disposed within each of said counterbores to meter lubricant flowing through each of said branches downstream into said counterbore and to the bearing means in bearing engagement with the cylindrical outer bearing surface of said trunnions, said filtering means being a screen provided upstream of each of said metering orifices to filter particulate matter from said lubricant to avoid clogging of said metering orifice and to ensure the free flow of said lubricant through said orifice, there being a radially extending surface at the junction of each branch and said counterbore, said metering orifice member being a substantially rigid member and is held fixedly in place within said counterbore near said radially extending shoulder by interference fit between its outer surface and said inner cylindrical surface of said counterbore.

2. A universal joint including a cross operably connected therein as set forth in claim 1, wherein a diffusion baffle plate having a plurality of apertures therein is fixedly disposed in said each counterbore downstream of and near said metering orifice member to provide a uniform flow of said lubricant to said bearing means and to avoid the generation of any air pockets within said lubricant flowing to said bearing means.

3. A universal joint including a cross operably connected therein as set forth in claim 2, wherein there is one metering orifice in said metering member centrally disposed thereon and there are 10 apertures in said baffle plate.

4. A universal joint including a cross operably connected therein as set forth in claim 2, wherein said baffle plate is of substantially rigid plastic material pressfitted within said counterbore.

5. A universal joint including a cross operably connected therein as set forth in claim 4, wherein said metering member and said baffle plate are nylon and each said baffle plate and said metering orifice member are carried by a cylindrical plastic member the outer cylindrical surface of which is in interference fit relation with the inner cylindrical surface of said counterbore.

6. A universal joint including a cross operably connected therein as set forth in claim 5, wherein said baffle plate is formed integrally with said cylindrical plastic member which is of nylon.

7. A universal joint including a cross operably connected therein as set forth in claim 6, wherein said metering member is pressfitted with the inner surface of the nylon cylindrical member.

8. A universal joint including a cross operably connected therein as set forth in claim 1, wherein said metering member is a steel cupped shaped member whose annular lip is in interference fit relation with the inner surface of said counterbore.

9. A universal joint including a cross operably connected therein as set forth in claim 2, wherein there is a substantially small space between the downstream side of said metering member and the upstream side of said baffle plate.

10. A cross for a universal joint comprising a body having four trunions extending therefrom along two mutually perpendicular lines, a lubrication network in said body and said trunions to provide lubrication to the cylindrical outer bearing surface of said trunions, said network including a branch in each of said trunions, each of said branches in communication with each other and each terminating in a counterbore provided internally and at an extended end of each of said trunions, each said counterbore having a cylindrical inner surface coaxial with said cylindrical outer bearing surface of said trunions, said counterbore being open at its end opposite said branches, a flow metering member having at least one metering orifice therethrough fixedly disposed within each of said counterbores to meter lubricant flowing from each of said branches downstream into said counterbore and to the bearing means in bearing engagement with the cylindrical outer bearing surface of said trunion, a filtering means includes a screen provided upstream of each of said metering orifices to filter particulate matter from the lubricant to avoid clogging of said metering orifice and to ensure the free flow of said lubricant through said orifice, a diffusion baffle plate having a plurality of apertures therein is fixedly disposed in each counterbore downstream of and near said metering orifice member to provide a uniform flow of said lubricant to said bearing means and to avoid the generation of any air pockets within the lubricant flowing to said bearing means.

* * * * *